US012797974B2

(12) United States Patent
Ogawa

(10) Patent No.: US 12,797,974 B2
(45) Date of Patent: Nov. 17, 2026

(54) ROTARY TOOL AND METHOD FOR MANUFACTURING MACHINED PRODUCT

(71) Applicant: KYOCERA CORPORATION, Kyoto (JP)

(72) Inventor: Hiroshi Ogawa, Omihachiman (JP)

(73) Assignee: KYOCERA CORPORATION, Kyoto (JP)

( * ) Notice: Subject to any disclaimer, the term of this patent is extended or adjusted under 35 U.S.C. 154(b) by 584 days.

(21) Appl. No.: 18/262,373

(22) PCT Filed: Jan. 20, 2022

(86) PCT No.: PCT/JP2022/001934
§ 371 (c)(1),
(2) Date: Jul. 20, 2023

(87) PCT Pub. No.: WO2022/158514
PCT Pub. Date: Jul. 28, 2022

(65) Prior Publication Data
US 2024/0109137 A1 Apr. 4, 2024

(30) Foreign Application Priority Data
Jan. 21, 2021 (JP) ................................ 2021-008127

(51) Int. Cl.
*B23C 5/10* (2006.01)

(52) U.S. Cl.
CPC ........ *B23C 5/10* (2013.01); *B23C 2210/0485* (2013.01); *B23C 2210/321* (2013.01); *B23C 2210/40* (2013.01)

(58) Field of Classification Search
CPC .................. B23D 67/06; B23D 71/005; B23C 2210/0492; B23C 2210/282;
(Continued)

(56) References Cited

U.S. PATENT DOCUMENTS 2,344,954 A * 3/1944 Aber ......................... B23C 5/02 407/62
2,344,956 A * 3/1944 Aber ......................... B23C 5/02 409/132
(Continued)

FOREIGN PATENT DOCUMENTS

CN 206296476 U 7/2017
JP H01-321108 A 12/1989
JP 2013-022657 A 2/2013

*Primary Examiner* — Alan Snyder
(74) *Attorney, Agent, or Firm* — HAUPTMAN HAM, LLP

(57) ABSTRACT

A rotary tool in a non-limiting embodiment of the present disclosure has a columnar shape. A first flute has a first helix angle having a positive value. A second flute has a second helix angle having a negative value. An outer peripheral surface includes a first outer peripheral surface and a second outer peripheral surface. A second outer peripheral surface is located on a rear side in a rotation direction of a rotation axis with respect to the first outer peripheral surface. The first outer peripheral surface includes a first flank surface extending along a first cutting edge, and a second flank surface extending along a second cutting edge. The first flank surface includes a first enlarged part whose width increases as coming closer to the second flank surface.

6 Claims, 8 Drawing Sheets

(58) Field of Classification Search
CPC .......... B23C 2210/28; B23C 2210/326; B23C 2210/54; B23C 2210/40; B23C 2210/32; B23C 2210/24; B23C 2210/0485; B23C 5/02; B23C 5/10
See application file for complete search history.

(56) References Cited

U.S. PATENT DOCUMENTS

| | | | | |
|---|---|---|---|---|
| 5,626,444 | A | 5/1997 | Campian | |
| 6,234,725 | B1 * | 5/2001 | Campian | B23Q 11/0046 408/67 |
| 10,272,504 | B2 * | 4/2019 | Dodds | B23P 15/34 |
| 2017/0216936 | A1 * | 8/2017 | Dodds | B23C 5/10 |
| 2024/0024970 | A1 * | 1/2024 | Walcher | B23C 5/10 |

* cited by examiner

ROTARY TOOL AND METHOD FOR MANUFACTURING MACHINED PRODUCT

CROSS-REFERENCE TO RELATED APPLICATION

This application is a national stage entry according to 35 U.S.C. 371 of PCT Application No. PCT/JP2022/001934 filed on Jan. 20, 2022, which claims priority to Japanese Patent Application No. 2021-008127, filed Jan. 21, 2021. The contents of this application are incorporated herein by reference in their entirety.

TECHNICAL FIELD

The present disclosure generally relates to a rotary tool used for a milling process of a workpiece, and a method for manufacturing a machined product.

BACKGROUND

For example, rotary tools discussed in Japanese Unexamined Patent Publication No. 1-321108 (Patent Document 1) and Japanese Unexamined Patent Publication No. 2013-022657 (Patent Document 2) are known as a rotary tool used for a milling process of a workpiece, such as metal. The rotary tool discussed in Patent Document 1 includes an outer peripheral surface, a chip discharge flute and a cutting edge. The outer peripheral surface includes a margin and a clearance. The rotary tool discussed in Patent Document 2 includes a first forward-twisted flute, a second reverse-twisted flute, a first forward-twisted cutting edge, and a second reverse-twisted cutting edge.

SUMMARY

A rotary tool in a non-limiting embodiment of the present disclosure has a columnar shape extending along a rotation axis from a first end toward a second end, and includes an outer peripheral surface, a first flute, a second flute, a first cutting edge, and a second cutting edge. The first flute extends spirally around the rotation axis from the first end toward the second end, and has a first helix angle. The second flute extends spirally around the rotation axis from the first end toward the second end, and has a second helix angle. The first cutting edge is located at an intersection of the outer peripheral surface and the first flute. The second cutting edge is located at an intersection of the outer peripheral surface and the second flute.

The first helix angle is a positive value, and the second helix angle is a negative value. The first flute intersects with the second flute, and the first cutting edge connects to the second cutting edge. The outer peripheral surface includes a first outer peripheral surface and a second outer peripheral surface. The first outer peripheral surface extends along the first cutting edge and the second cutting edge. The second outer peripheral surface is located on a rear side in a rotation direction of the rotation axis with respect to the first outer peripheral surface. The first outer peripheral surface includes a first flank surface extending along the first cutting edge, and a second flank surface extending along the second cutting edge. The first flank surface includes a first enlarged part whose width increases as coming closer to the second flank surface.

EMBODIMENTS

<Rotary Tools>

Figure 1:
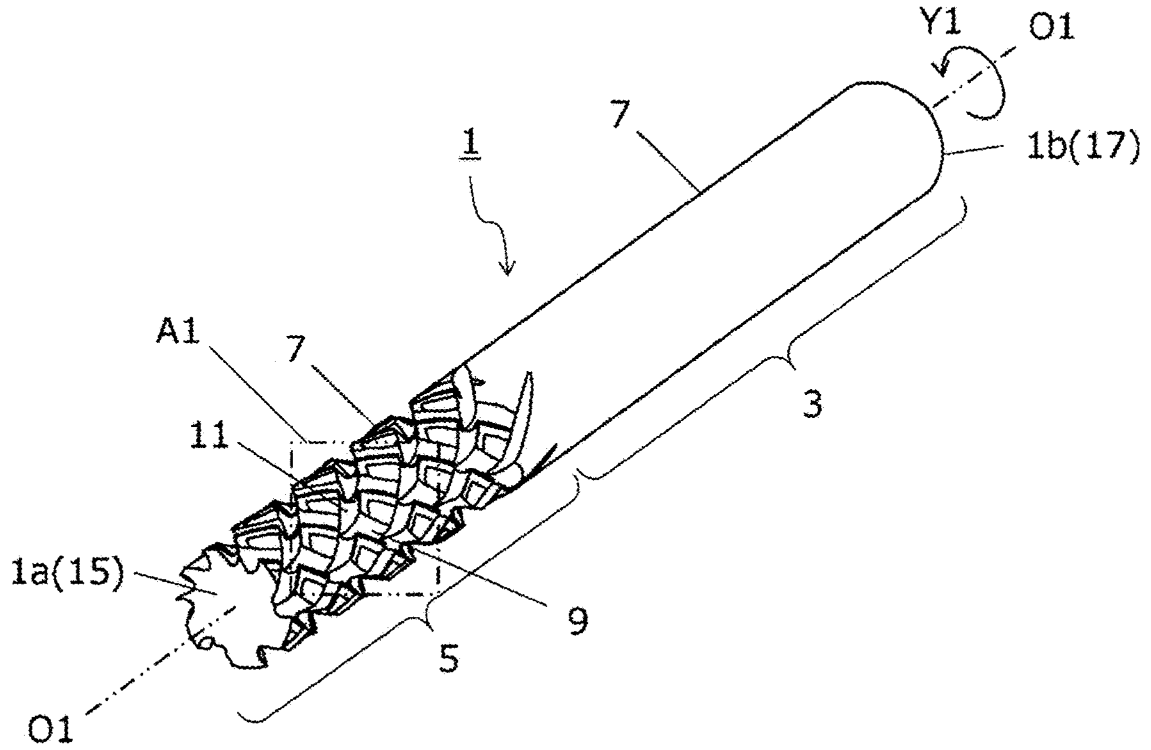
FIG. 1 is a perspective view illustrating a rotary tool in a non-limiting embodiment of the present disclosure.
Figure 2:
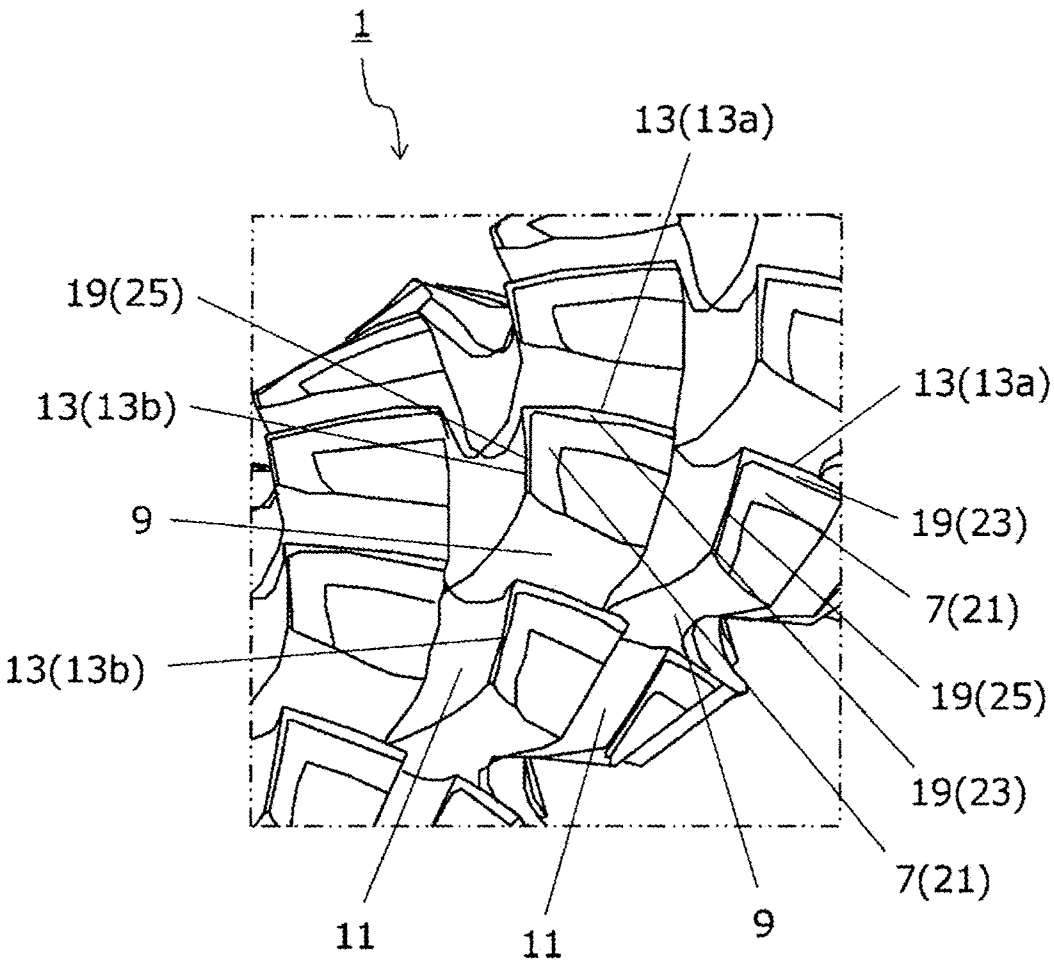
FIG. 2 is an enlarged view of a region A1 illustrated in FIG. 1.
Figure 3:
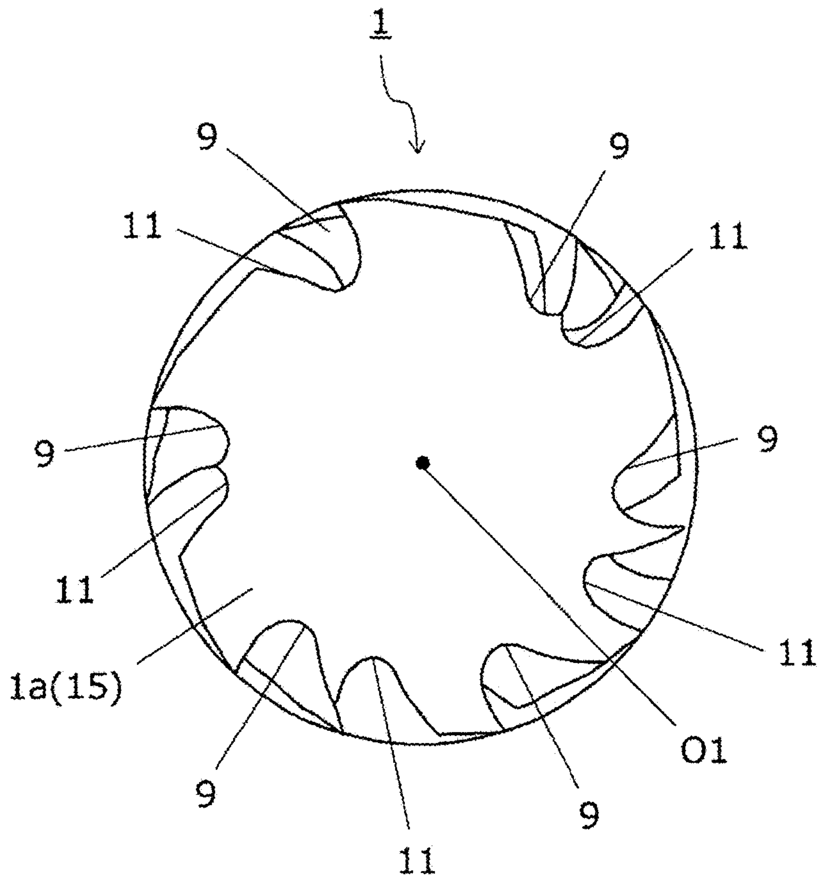
FIG. 3 is a diagram of the rotary tool illustrated in FIG. 1 as viewed toward a first end.

Rotary tools 1 in non-limiting embodiments of the present disclosure are individually described in detail with reference to the drawings. For convenience of description, the drawings referred to in the following may illustrate, in simplified form, only main members necessary for describing the non-limiting embodiments. The rotary tools 1 may therefore include any arbitrary structural member not illustrated in the drawings referred to. Dimensions of the members in each of the drawings are not limited to ones which faithfully represent dimensions of actual structural members and dimensional ratios of these members.

The rotary tools 1 may be an end mill or milling cutter. The rotary tools 1 may be of an insert type that a cutting part (cutting part 5) and a holding part (shank part 3) are formed as separate bodies, or alternatively may be of a solid type that the cutting part and the holding part are formed integrally. Therefore, as in the non-limiting embodiments illustrated in FIGS. 1 to 7, the rotary tools 1 may be a solid end mill.

Each of the rotary tools 1 may extend along a rotation axis O1 from a first end 1*a* to a second end 1*b* as in the non-limiting embodiment illustrated in FIG. 1. More specifically, the rotary tool 1 may have a columnar shape extending along the rotation axis O1 from the first end 1*a* to the second end 1*b*. In general, the first end 1*a* may be called "a front end," and the second end 1*b* may be called "a rear end." The rotary tool 1 may be rotatable around the rotation axis O1. An arrow Y1 in FIG. 1 and the like may indicate a rotation direction of the rotation axis O1.

The rotary tool 1 may include the shank part 3 and the cutting part 5. The shank part 3 may be a part that can be held in a rotating spindle of a machine tool. The shank part 3 may be designed according to a shape of the spindle in the machine tool.

The cutting part 5 may be located on a side of the first end 1*a* with respect to the shank part 3. The cutting part 5 is a part that is contactable with a workpiece and is capable of exerting an important role in a machining process (for example, shoulder milling) of the workpiece.

An outer diameter D of the cutting part 5 is not limited to a specific value. For example, a maximum value of the outer diameter D may be set to 4-50 mm. A length L of the cutting part 5 in a direction along the rotation axis O1 may be set to L=1.5D to 12D.

The cutting part 5 may include an outer peripheral surface 7, a first flute 9, a second flute 11 and a cutting edge 13. In other words, the rotary tool 1 may include the outer peripheral surface 7, the first flute 9, the second flute 11 and the cutting edge 13. The cutting edge 13 may include a first cutting edge 13*a* and a second cutting edge 13*b*. The rotary tool 1 may further include a first end surface 15 and a second end surface 17. The first end surface 15 may be a flat surface located at the first end 1*a* in the rotary tool 1. The second end surface 17 may be a flat surface located at the second end 1*b* in the rotary tool 1.

The outer peripheral surface 7 may extend from a side of the first end 1*a* toward a side of the second end 1*b* in the rotary tool 1 having the columnar shape. The outer peripheral surface 7 may extend from the first end surface 15 to the second end surface 17 as in the non-limiting embodiment illustrated in FIG. 1.

The first flute 9 may spirally extends around the rotation axis O1 from the first end 1*a* toward the second end 1*b*. The first flute 9 may serve as a so-called chip discharge flute. An inclination angle of the spirally extending chip discharge flute with respect to the rotation axis O1 is generally called a helix angle. The inclination angle of the spirally extending first flute 9 with respect to the rotation axis O1 may be a first helix angle θ1.

Although the first helix angle θ1 is illustrated for the sake of convenience in FIG. 5, the first helix angle θ1 may be evaluated in the following procedure. The first step is to determine a ridgeline (first ridgeline) where the first flute 9 intersects with a part of the outer peripheral surface 7 which is adjacent to the first flute 9 on a rear side in a rotation direction Y1 of the rotation axis O1. An angle at which the first ridgeline intersects with the rotation axis O1 is measured in a side view of the rotary tool 1. The angle may be evaluated as the first helix angle θ1.

The first ridgeline may be the first cutting edge 13*a*. That is, the first cutting edge 13*a* may be located at an intersection of the outer peripheral surface 7 and the first flute 9. The first cutting edge 13*a* is usable for machining a workpiece in a machining process of the workpiece indented for manufacturing a machined product. The first cutting edge 13*a* may be located on the whole or a part of the first ridgeline.

If the first ridgeline is the first cutting edge 13*a*, the first ridgeline need not be a ridgeline where two surfaces strictly intersect with each other. From the viewpoint of improving durability of the first cutting edge 13*a*, a so-called honing surface may be formed on the intersection of the outer peripheral surface 7 and the first flute 9. The honing surface may be a first honing surface.

If the first honing surface is small and the first honing surface can be macroscopically regarded as a line, the intersection of the outer peripheral surface 7 and the first flute 9 may be evaluated as the first ridgeline. If the first honing surface is large and the first honing surface cannot be macroscopically regarded as a line, a boundary between the first honing surface and the outer peripheral surface 7 may be regarded as the first ridgeline.

The second flute 11 may spirally extend around the rotation axis O1 from the first end 1*a* toward the second end 1*b*. Similarly to the first flute 9, the second flute 11 may serve as a chip discharge flute. An inclination angle of the spirally extending second flute 11 with respect to the rotation axis O1 may be a second helix angle θ2.

Although the second helix angle θ2 is illustrated for the sake of convenience in FIG. 5, the second helix angle θ2 may be evaluated in the following procedure. The first step is to determine a ridgeline (second ridgeline) where the second flute 11 intersects with a part of the outer peripheral surface 7 which is adjacent to the second flute 11 on a rear side in the rotation direction Y1 of the rotation axis O1. An angle at which the second ridgeline intersects with the rotation axis O1 is measured in a side view of the rotary tool 1. The angle may be evaluated as the second helix angle θ2.

The second ridgeline may be the second cutting edge 13*b*. That is, the second cutting edge 13*b* may be located at an intersection of the outer peripheral surface 7 and the second flute 11. The second cutting edge 13*b* is usable for machining a workpiece in a machining process of the workpiece. The second cutting edge 13*b* may be located on the whole or a part of the second ridgeline.

If the second ridgeline is the second cutting edge 13*b*, the second ridgeline need not be a ridgeline where two surfaces strictly intersect with each other. Similarly to the first cutting edge 13*a*, from the viewpoint of improving durability of the second cutting edge 13*b*, a so-called honing surface may be formed at the intersection of the outer peripheral surface 7 and the second flute 11. The honing surface may be a second honing surface.

If the second honing surface is small and the second honing surface can be macroscopically regarded as a line, the intersection of the outer peripheral surface 7 and the second flute 11 may be evaluated as the second ridgeline. If the second honing surface is large and the second honing surface cannot be macroscopically regarded as a line, a boundary between the second honing surface and the outer peripheral surface 7 may be regarded as the second ridgeline.

The rotary tool 1 may include only one first flute 9, or alternatively may include a plurality of first flutes 9 as in the non-limiting embodiment illustrated in the drawings. If the rotary tool 1 includes the plurality of first flutes 9, the rotary tool 1 may include a plurality of first cutting edges 13*a*. The rotary tool 1 may include only one second flute 11, or alternatively may include a plurality of second flutes 11 as in the non-limiting embodiment illustrated in the drawings. If the rotary tool 1 includes the plurality of second flutes 11, the rotary tool 1 may include a plurality of second cutting edges 13*b*.

Figure 4:
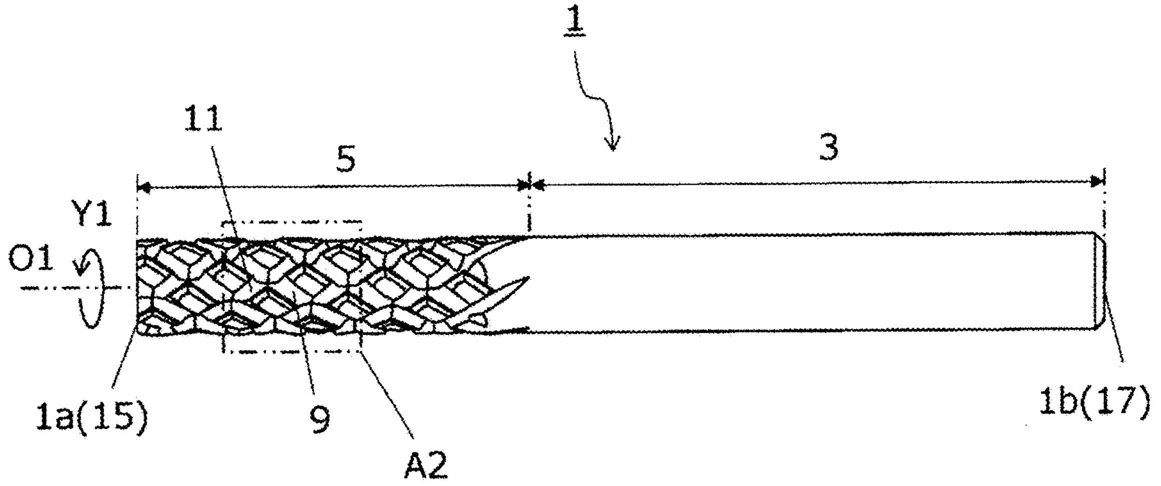
FIG. 4 is a side view of the rotary tool illustrated in FIG. 1.

As in a non-limiting embodiment illustrated in FIG. 4, the first flute 9 may be twisted toward a rear side in the rotation direction Y1 of the rotation axis O1 as coming closer to the second end 1*b*. In contrast to the first flute 9, the second flute 11 may be twisted toward a front side in the rotation direction Y1 of the rotation axis O1 as coming closer to the second end 1*b*. That is, the first helix angle θ1 may be a positive value, and the second helix angle θ2 may be a negative value. In other words, the first cutting edge 13*a* may be a forward-twisted cutting edge, and the second cutting edge 13*b* may be a reverse-twisted cutting edge.

The first flute 9 may intersect with the second flute 11, and the first cutting edge 13*a* may connect to the second cutting edge 13*b*. If the rotary tool 1 includes the first flute 9, the second flute 11, the first cutting edge 13*a* and the second cutting edge 13*b*, it is possible to carry out a good machining process. It is easy to offer a good machining performance even if a workpiece includes a fiber component, such as CFRP (Carbon Fiber Reinforced Plastics).

The outer peripheral surface 7 may include a first outer peripheral surface 19 and a second outer peripheral surface 21. The first outer peripheral surface 19 may extend along the first cutting edge 13*a* and the second cutting edge 13*b*. The second outer peripheral surface 21 may be located on a rear side in the rotation direction Y1 of the rotation axis O1 with respect to the first outer peripheral surface 19. The first outer peripheral surface 19 and the second outer peripheral surface 21 may serve as a so-called flank surface.

The first outer peripheral surface 19 and the second outer peripheral surface 21 may be individually a smooth surface. Specifically, the first outer peripheral surface 19 and the second outer peripheral surface 21 may be individually a flat surface or a curved surface. If the first outer peripheral surface 19 and the second outer peripheral surface 21 are individually smooth and a ridgeline is formed between these two surfaces, a boundary between the first outer peripheral surface 19 and the second outer peripheral surface 21 is easily determinable.

The first outer peripheral surface 19 may be a curved surface whose distance from the rotation axis O1 is constant. The second outer peripheral surface 21 may be recessed relative to the first outer peripheral surface 19. In other words, the second outer peripheral surface 21 may be located closer to the rotation axis O1 than the first outer peripheral surface 19.

The first outer peripheral surface 19 may include a first flank surface 23 and a second flank surface 25. The first flank surface 23 may extend along the first cutting edge 13*a*. In other words, the first flank surface 23 may extend from the first cutting edge 13*a* toward a rear side in the rotation direction Y1 of the rotation axis O1. The second flank surface 25 may extend along the second cutting edge 13*b*. In other words, the second flank surface 25 may extend from the second cutting edge 13*b* toward the rear side in the rotation direction Y1 of the rotation axis O1.

The first flank surface 23 may include a first enlarged part 27. The first enlarged part 27 may be at least a part of the first flank surface 23. The first enlarged part 27 may be a part whose width W1 in a direction orthogonal to the first cutting part 13*a* increases as coming closer to the second flank surface 25. If the first flank surface 23 includes the first enlarged part 27, it is easy to maintain a large width of the first outer peripheral surface 19 in the vicinity of a connecting part of the first cutting edge 13*a* and the second cutting edge 13*b*. This facilitates improvement in durability of the cutting edge 13. Consequently, the rotary tool 1 has enhanced durability.

Figure 5:
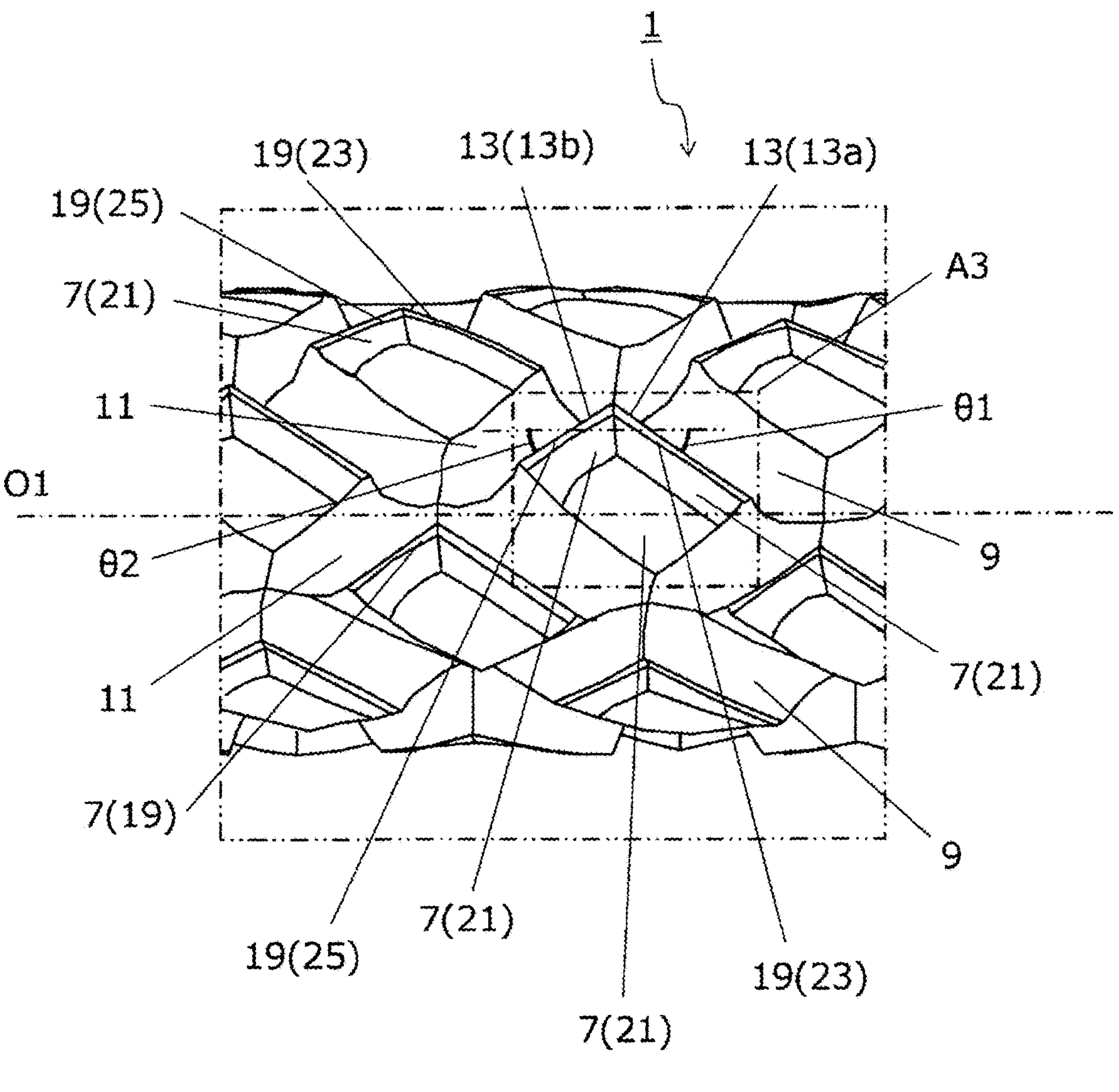
FIG. 5 is an enlarged view of a region A2 illustrated in FIG. 4.
Figure 6:
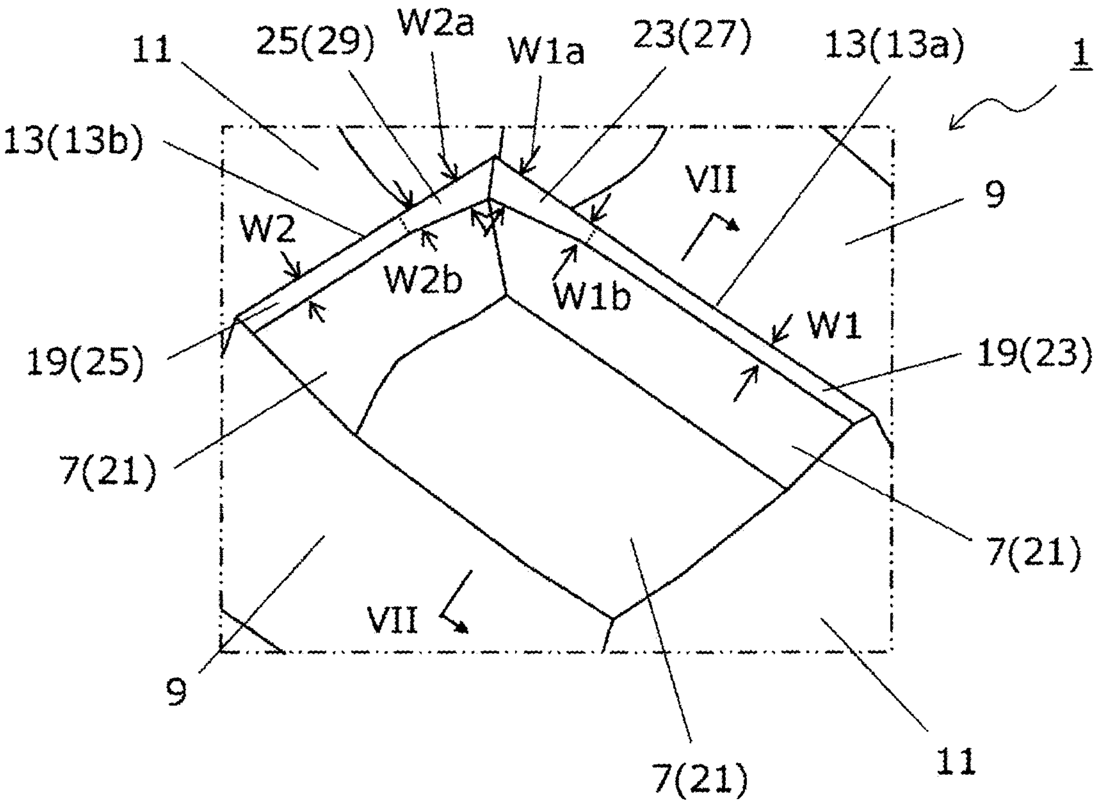
FIG. 6 is an enlarged view of a region A3 illustrated in FIG. 5.
Figure 7:
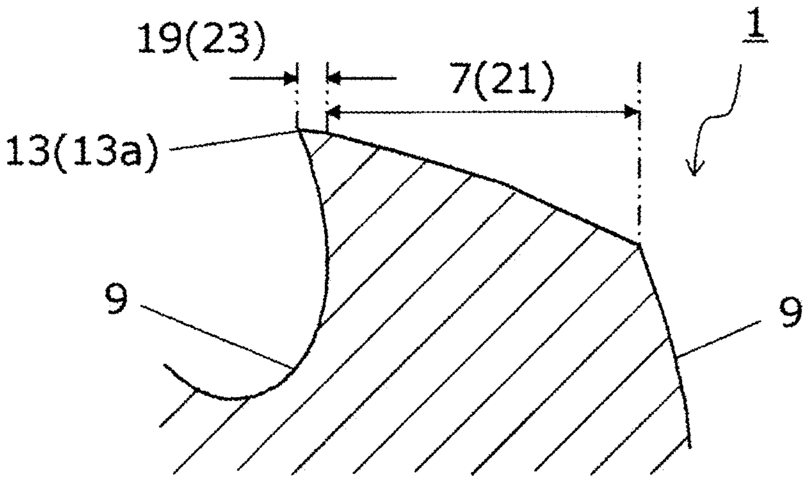
FIG. 7 is an enlarged view of a cross section taken along the line VII-VII in an insert illustrated in FIG. 6.
Figure 8:
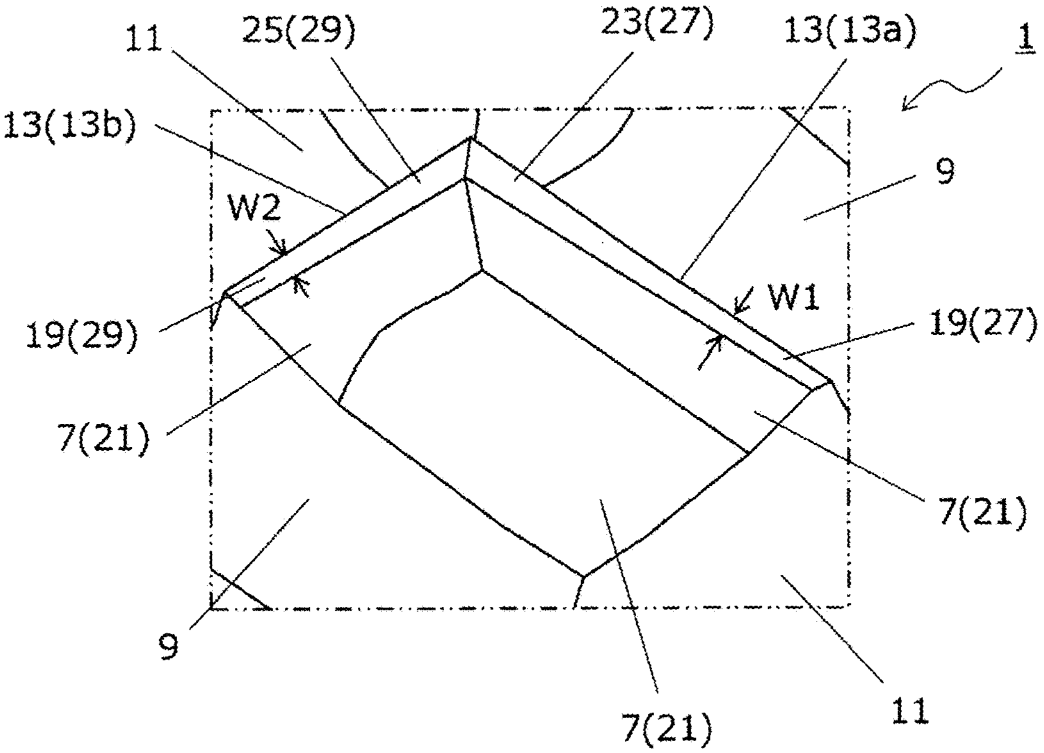
FIG. 8 is an enlarged view of a region corresponding to the region A3 in the rotary tool in the non-limiting embodiment of the present disclosure.

The whole of the first flank surface 23 may correspond to the first enlarged part 27 as in a non-limiting embodiment illustrated in FIG. 8, or alternatively only a part of the first flank surface 23 may correspond to the first enlarged part 27 as in a non-limiting embodiment illustrated in FIG. 5. If only the part of the first flank surface 23 corresponds to the first enlarged part 27, a region having an extremely small width is less likely to occur in the first flank surface 23, thus leading to enhanced durability of the first cutting edge 13*a* as a whole.

In cases where the first flank surface 23 includes the first enlarged part 27, a difference between a width W1*a* in a direction orthogonal to the first cutting edge 13*a* at an end part close to the second flank surface 25 in the first enlarged part 27 and a width W1*b* in a direction orthogonal to the first cutting edge 13*a* at an end part away from the second flank surface 25 in the first enlarged part 27 is not limited to a specific value. From the viewpoint of avoiding unavoidable variations in manufacturing steps, for example, a ratio of the width W1*a* and the width W1*b* (W1*a*/W1*b*) may be 1.1 to 2.

In cases where the only the part of the first flank surface 23 corresponds to the first enlarged part 27, the first enlarged part 27 may be located on a side relatively away from the second flank surface 25 in the first flank surface 23, or alternatively may be located on a side relatively close to the second flank surface 25 in the first flank surface 23. If the first enlarged part 27 is located on the side relatively close to the second flank surface 25 in the first flank surface 23, a width of the first flank surface 23 in the vicinity of the connecting part of the first cutting edge 13*a* and the second cutting edge 13*b* tends to locally increase. It is therefore easy to avoid contact between the first flank surface 23 and a workpiece.

If the first enlarged part 27 is located on the side relatively close to the second flank surface 25 in the first flank surface 23, the first enlarged part 27 may connect to the second flank surface 25. In other words, the first enlarged part 27 may be adjacent to the second flank surface 25.

For the same reason as in the cases where the first flank surface 23 includes the first enlarged part 27, the second flank surface 25 may include a second enlarged part 29. The second enlarged part 29 may be at least a part of the second flank surface 25. The second enlarged part 29 may be a part whose width W2 in a direction orthogonal to the second cutting edge 13*b* increases as coming closer to the first flank surface 23. If the second flank surface 25 includes the second enlarged part 29, it is easy to maintain a large width of the first outer peripheral surface 19 in the vicinity of the connecting part of the first cutting edge 13*a* and the second cutting edge 13*b*. This further facilitates improvement in durability of the cutting edge 13.

The whole of the second flank surface 25 may correspond to the second enlarged part 29 as in the non-limiting embodiment illustrated in FIG. 8, or alternatively only a part of the second flank surface 25 may correspond to the second enlarged part 29 as in the non-limiting embodiment illustrated in FIG. 5. If only the part of the second flank surface 25 corresponds to the second enlarged part 29, a region having an extremely small width is less likely to occur in the second flank surface 25, thus leading to enhanced durability of the second cutting edge 13*b* as a whole.

In cases where the second flank surface 25 includes the second enlarged part 29, a difference between a width W2*a* in a direction orthogonal to the second cutting edge 13*b* at an end part close to the first flank surface 23 in the second enlarged part 29 and a width W2*b* in the direction orthogonal to the second cutting edge 13*b* at an end part away from the first flank surface 23 in the second enlarged part 29 is not limited to a specific value. From the viewpoint of avoiding unavoidable variations in manufacturing steps, for example, a ratio of the width W2*a* and the width W2*b* (W2*a*/W2*b*) may be 1.1 to 2.

In cases where the only the part of the second flank surface 25 corresponds to the second enlarged part 29, the second enlarged part 29 may be located on a side relatively away from the first flank surface 23 in the second flank surface 25, or alternatively may be located on a side relatively close to the first flank surface 23 in the second flank surface 25. If the second enlarged part 29 is located on the side relatively close to the first flank surface 23 in the second flank surface 25, a width of the second flank surface 25 in the vicinity of the connecting part of the first cutting edge 13*a* and the second cutting edge 13*b* tends to locally increase. It is therefore easy to avoid contact between the second flank surface 25 and a workpiece.

If the second enlarged part 29 is located on the side relatively close to the first flank surface 23 in the second flank surface 25, the second enlarged part 29 may connect to the first flank surface 23. In other words, the second enlarged part 29 may be adjacent to the first flank surface 23.

The first outer peripheral surface 19 may further include a convex part 31 or a concave part 33.

Figure 9:
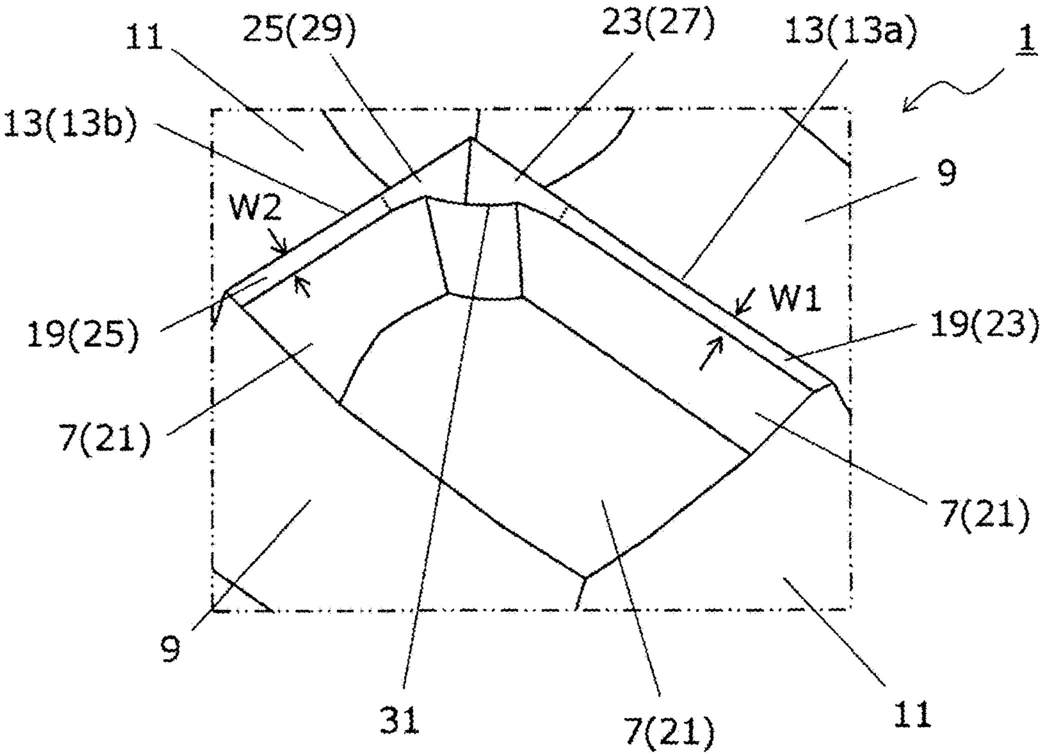
FIG. 9 is an enlarged view of a region corresponding to the region A3 in the rotary tool in the non-limiting embodiment of the present disclosure.

The convex part 31 may be located at a connecting part of the first flank surface 23 and the second flank surface 25 in the first outer peripheral surface 19, and may be protruded relative to the second outer peripheral surface 21 as in a non-limiting embodiment illustrated in FIG. 9. If the first outer peripheral surface 19 includes the convex part 31, a width of a flank surface formed by the first flank surface 23 and the second flank surface in the vicinity of the connecting part of the first cutting edge 13*a* and the second cutting edge 13*b* tends to increase, thus leading to enhanced durability of the cutting edge 13.

Figure 10:
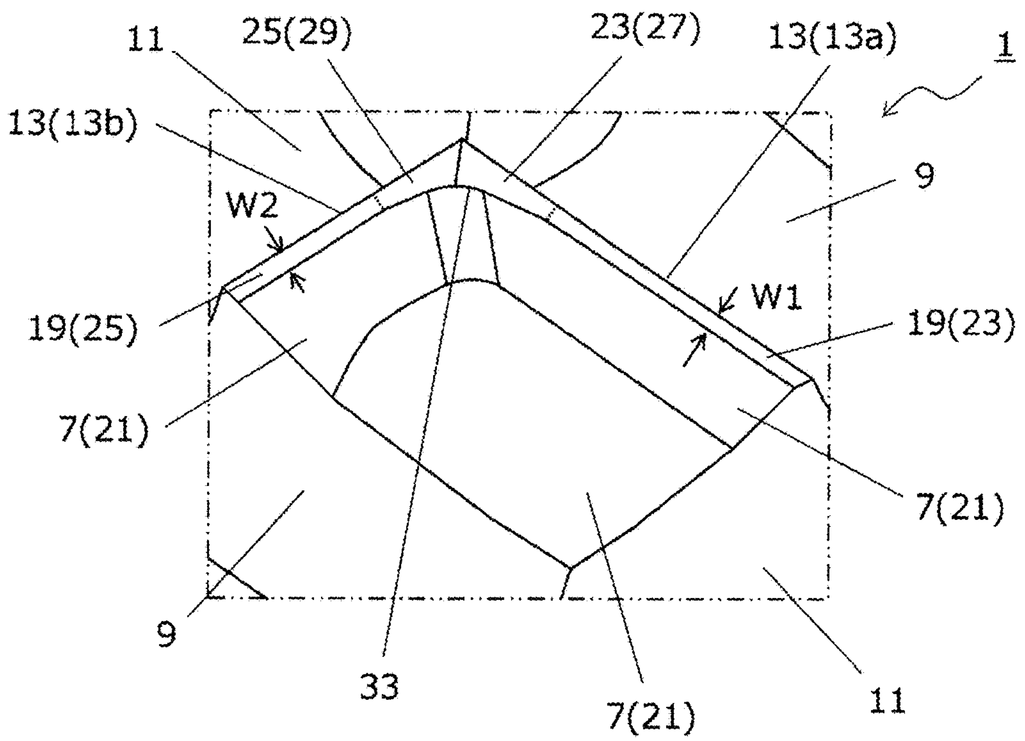
FIG. 10 is an enlarged view of a region corresponding to the region A3 in the rotary tool in the non-limiting embodiment of the present disclosure.

The concave part 33 may be located at a connecting part of the first flank surface 23 and the second flank surface 25 in the first outer peripheral surface 19, and may be recessed relative to the second outer peripheral surface 21 as in a non-limiting embodiment illustrated in FIG. 10. If the first outer peripheral surface 19 includes the concave part 33, a cutting load applied to the connecting part of the first cutting edge 13*a* and the second cutting edge 13*b* tends to be dispersed over the first flank surface 23 and the second flank surface 25. Consequently, also in cases where the first outer peripheral surface 19 includes the concave part 33, the cutting edge 13 has enhanced durability as in the cases where the first outer peripheral surface 19 includes the convex part 31.

Additionally, in the cases where the first outer peripheral surface 19 includes the concave part 33, a machined surface of a workpiece may be less prone to damage than in the cases where the first outer peripheral surface 19 includes the convex part 31. In the cases where the first outer peripheral surface 19 includes the concave part 33, it is easy to decrease an area of the first outer peripheral surface 19, and it is easy to increase an area of the second outer peripheral surface 21. Therefore, for example, if the second outer peripheral surface 21 is recessed relative to the first outer peripheral surface 19, a surface brought into contact with the machined surface of the workpiece in the outer peripheral surface 7 tends to become small.

The first helix angle θ1 and the second helix angle θ2 are not limited to a specific value. For example, the first helix angle θ1 may be set to approximately 20-60°. The second helix angle θ2 may be set to approximately 20-60°. Values of θ1 and θ2 may be approximately the same. Specifically, a difference between the values θ1 and θ2 may be 5° or less.

For example, cemented carbide and cermet are usable as a material of the rotary tool 1. Examples of composition of the cemented carbide may include WC—Co, WC—TiC—Co and WC—TiC—TaC—Co, in which WC, TiC and TaC may be hard particles, and Co may be a binding phase.

The cermet may be a sintered composite material obtainable by compositing metal into a ceramic component. Examples of the cermet may include titanium compounds composed mainly of titanium carbide (TiC) or titanium nitride (TiN). However, the above materials are non-limiting embodiments, and the material of the rotary tool 1 is not limited to these.

A surface of the rotary tool 1 may be coated with a coating film by using chemical vapor deposition (CVD) method or physical vapor deposition (PVD) method. Examples of composition of the coating film may include titanium carbide (TiC), titanium nitride (TiN), titanium carbonitride (TiCN) and alumina ($Al_2O_3$).

<Method for Manufacturing Machined Product>

Figure 12:
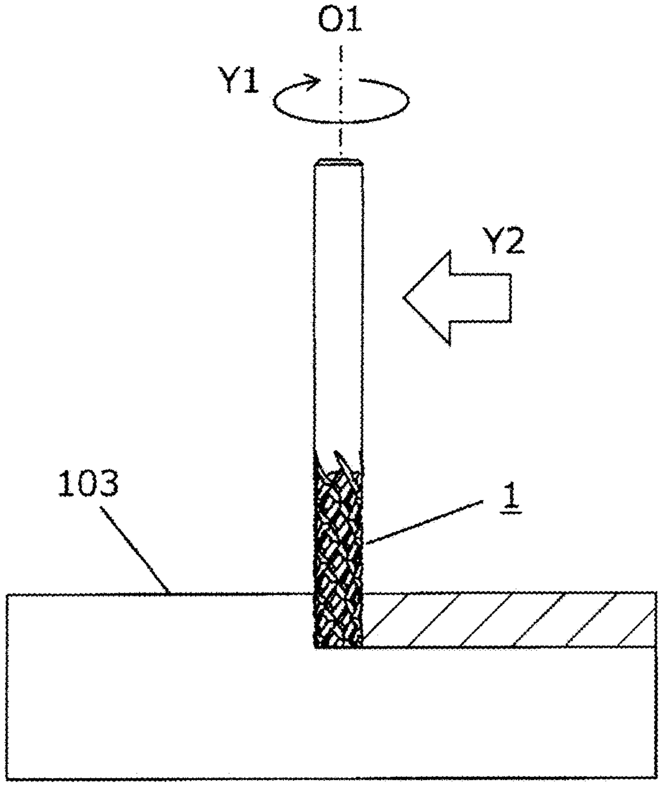
FIG. 12 is a schematic diagram illustrating one of the steps in the method for manufacturing a machined product in the non-limiting embodiment of the present disclosure.
Figure 13:
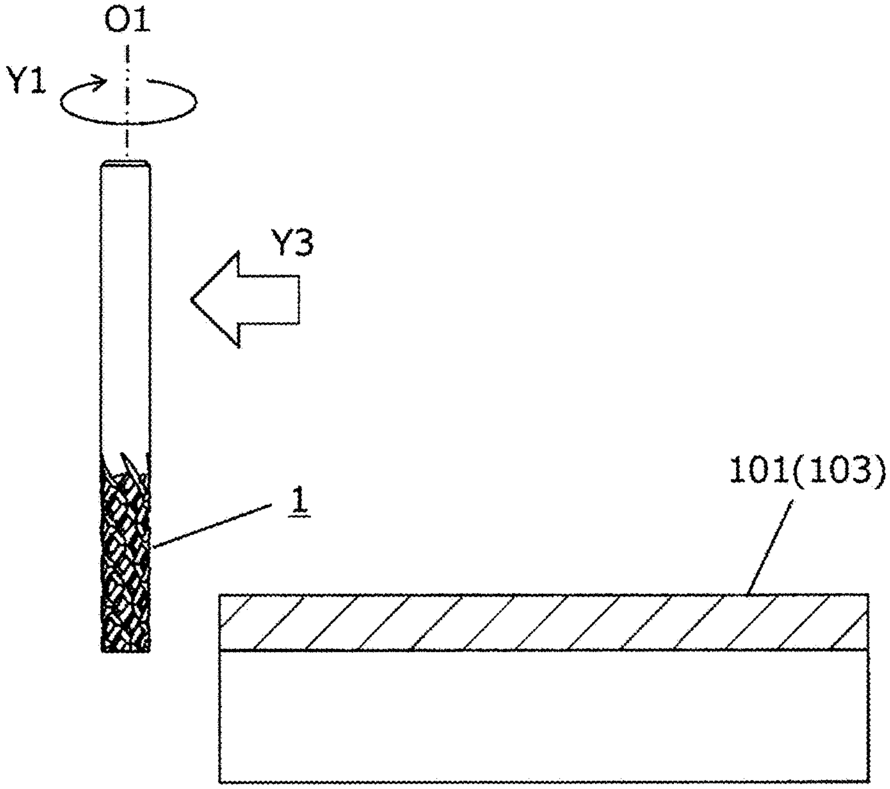
FIG. 13 is a schematic diagram illustrating one of the steps in the method for manufacturing a machined product in the non-limiting embodiment of the present disclosure.

A method for manufacturing a machined product 101 in a non-limiting embodiment is described in detail below with reference to FIGS. 11 to 13. Although the rotary tool 1 illustrated in FIG. 1 is used in the non-limiting embodiment illustrated in FIGS. 11 to 13, there is no intention to limit to this embodiment. Although the non-limiting embodiment illustrated in FIGS. 11 to 13 illustrates a shoulder milling as a machining process, the machining process is not limited to this embodiment.

The machined product 101 may be manufactured by carrying out a machining process of a workpiece 103. The method for manufacturing the machined product 101 may include the following steps (1) to (3).

Figure 11:
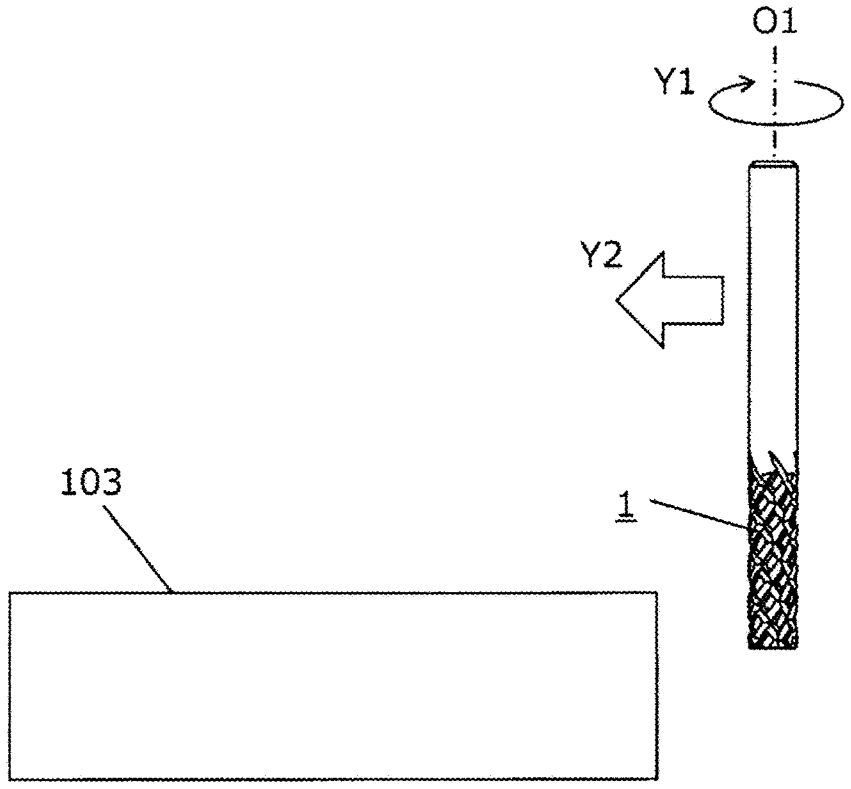
FIG. 11 is a schematic diagram illustrating one of steps in a method for manufacturing a machined product in a non-limiting embodiment of the present disclosure.

The step (1) is to move the rotary tool 1 close to the workpiece 103 in a Y2 direction by rotating the rotary tool 1 around the rotation axis O1 in a direction of an arrow Y1 (refer to FIG. 11).

The step (1) may be carried out, for example, by fixing the workpiece 103 onto a table of a machine tool to which the rotary tool 1 is attached, and by moving the rotary tool 1 being rotated close to the workpiece 103. In the step (1), the workpiece 103 and the rotary tool 1 may come closer to each other. For example, the workpiece 103 may be brought near the rotary tool 1.

The step (2) is to machine the workpiece 103 by moving the rotary tool 1 closer to the workpiece 103 so that the rotary tool 1 being rotated can come into contact with a desired position of a surface of the workpiece 103 (refer to FIG. 12).

In the step (2), the machining process may be carried out so that a part of the cutting part 5 in the rotary tool 1 can come into contact with the workpiece.

The step (3) is to move the rotary tool 1 away from the workpiece 103 in a Y3 direction (refer to FIG. 13).

Similarly to the step (1), also in the step (3), the workpiece 103 and the rotary tool 1 may be separated from each other. For example, the workpiece 103 may be moved away from the rotary tool 1. To facilitate visual understanding, hatching is applied to a machined surface in FIGS. 12 and 13.

Excellent machinability is achievable by undergoing the foregoing steps.

If the machining process of the workpiece 103 as described above is carried out a plurality of times, the step of bringing the cutting edge 13 of the rotary tool 1 into contact with different portions of the workpiece 103 may be repeated while keeping the rotary tool 1 rotated.

Examples of material of the workpiece 103 may include aluminum, carbon steel, alloy steel, stainless steel, cast iron and nonferrous metals.

The invention claimed is:

1. A rotary tool, having a columnar shape extending along a rotation axis of the rotary tool from a first end toward a second end, the rotary tool comprising:

an outer peripheral surface;

a first flute extending spirally around the rotation axis from the first end toward the second end and having a first helix angle;

a second flute extending spirally around the rotation axis from the first end toward the second end and having a second helix angle;

a first cutting edge located at an intersection of the outer peripheral surface and the first flute; and a second cutting edge located at an intersection of the outer peripheral surface and the second flute, wherein the first helix angle is a positive value, and the second helix angle is a negative value, the first flute intersects with the second flute, and the first cutting edge connects to the second cutting edge, the outer peripheral surface comprises a first outer peripheral surface extending along the first cutting edge and the second cutting edge, and a second outer peripheral surface located on a rear side in a rotation direction of the rotation axis with respect to the first outer peripheral surface, the first outer peripheral surface comprises a first flank surface extending along the first cutting edge, a second flank surface extending along the second cutting edge, and a concave part which is located at a connecting part of the first flank surface and the second flank surface, and recessed relative to the second outer peripheral surface, the first flank surface comprises a first enlarged part whose width in a first direction orthogonal to the first cutting edge increases as coming closer to the second flank surface, in a second direction along the first cutting edge, an end portion of the first enlarged part is located on an outer side of an end portion of the concave part, wherein a side of the connecting part is defined as an inner side, and a side opposite to the inner side is defined as the outer side, and at least a portion of the first enlarged part is located on a side farther from the second flank surface than a center of the first flank surface.

2. The rotary tool according to claim 1, wherein the first enlarged part is adjacent to the second flank surface.

3. The rotary tool according to claim 1, wherein the second flank surface comprises a second enlarged part whose width in a direction orthogonal to the second cutting edge increases as coming closer to the first flank surface.

4. The rotary tool according to claim 3, wherein the second enlarged part is adjacent to the first flank surface.

5. A method for manufacturing a machined product, the method comprising:

rotating a rotary tool;

bringing the rotary tool being rotated into contact with a workpiece; and moving the rotary tool away from the workpiece, wherein the rotary tool has a columnar shape extending along a rotation axis of the rotary tool from a first end toward a second end, the rotary tool comprises:

an outer peripheral surface;

a first flute extending spirally around the rotation axis from the first end toward the second end and having a first helix angle;

a second flute extending spirally around the rotation axis from the first end toward the second end and having a second helix angle;

a first cutting edge located at an intersection of the outer peripheral surface and the first flute; and a second cutting edge located at an intersection of the outer peripheral surface and the second flute, the first helix angle is a positive value, and the second helix angle is a negative value, the first flute intersects with the second flute, and the first cutting edge connects to the second cutting edge, the outer peripheral surface comprises a first outer peripheral surface extending along the first cutting edge and the second cutting edge, and a second outer peripheral surface located on a rear side in a rotation direction of the rotation axis with respect to the first outer peripheral surface, the first outer peripheral surface comprises a first flank surface extending along the first cutting edge, a second flank surface extending along the second cutting edge, and a concave part which is located at a connecting part of the first flank surface and the second flank surface, and recessed relative to the second outer peripheral surface, the first flank surface comprises a first enlarged part whose width in a first direction orthogonal to the first cutting edge increases as coming closer to the second flank surface, in a second direction along the first cutting edge, an end portion of the first enlarged part is located on an outer side of an end portion of the concave part, wherein a side of the connecting part is defined as an inner side, and a side opposite to the inner side is defined as the outer side, and at least a portion of the first enlarged part is located on a side farther from the second flank surface than a center of the first flank surface.

6. A rotary tool, having a columnar shape extending along a rotation axis of the rotary tool from a first end toward a second end, the rotary tool comprising:

an outer peripheral surface;

a first flute extending spirally around the rotation axis from the first end toward the second end and having a first helix angle;

a second flute extending spirally around the rotation axis from the first end toward the second end and having a second helix angle;

a first cutting edge located at an intersection of the outer peripheral surface and the first flute; and a second cutting edge located at an intersection of the outer peripheral surface and the second flute, wherein the first helix angle is a positive value, and the second helix angle is a negative value, the first flute intersects with the second flute, and the first cutting edge connects to the second cutting edge, the outer peripheral surface comprises a first outer peripheral surface extending along the first cutting edge and the second cutting edge, and a second outer peripheral surface located on a rear side in a rotation direction of the rotation axis with respect to the first outer peripheral surface, the first outer peripheral surface comprises a first flank surface extending along the first cutting edge, a second flank surface extending along the second cutting edge, and a convex part which is located at a connecting part of the first flank surface and the second flank surface, and projects relative to the second outer peripheral surface, the first flank surface comprises a first enlarged part whose width in a direction orthogonal to the first cutting edge increases as coming closer to the second flank surface, and at least a portion of the first enlarged part is located on a side farther from the second flank surface than a center of the first flank surface.

* * * * *